Figure 1:
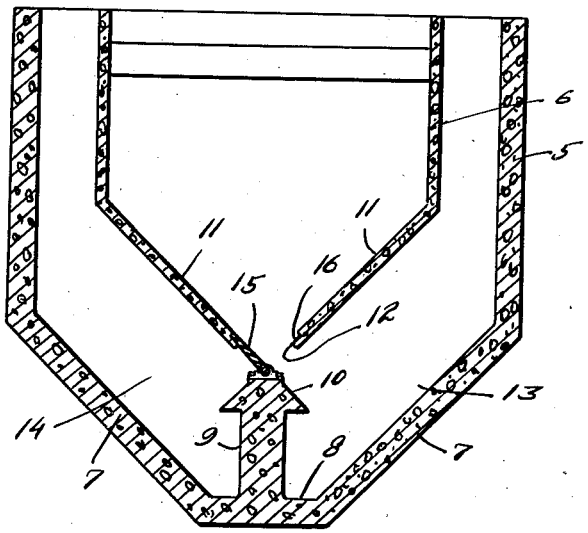

Feb. 3, 1942.  B. V. HOWE ET AL  2,272,004
SEWAGE PLANT
Filed Oct. 26, 1940   2 Sheets-Sheet 1

Inventors
Benjamin V. Howe
Glen A. Izett

By Clarence A. O'Brien

Attorney

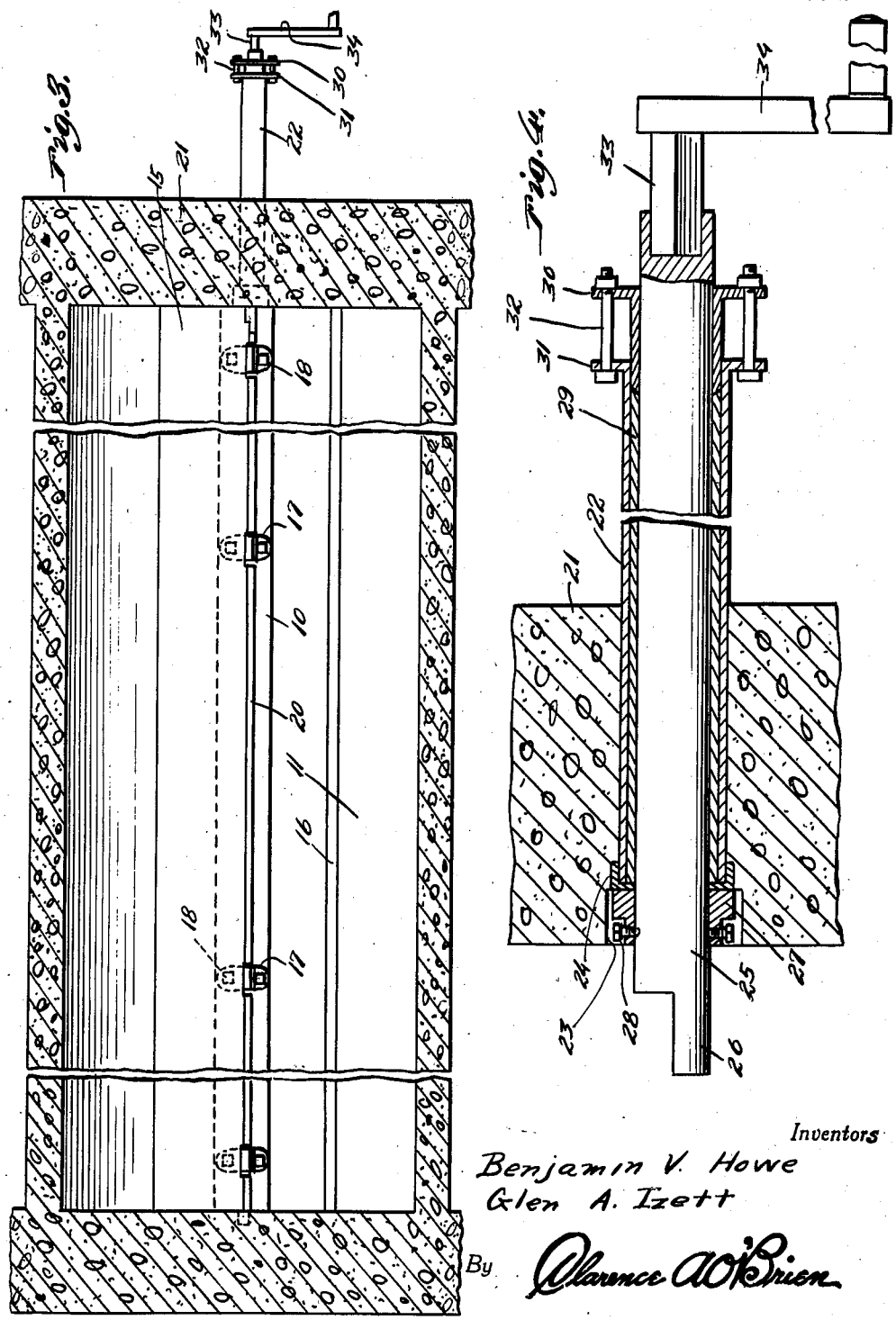

Patented Feb. 3, 1942

2,272,004

UNITED STATES PATENT OFFICE 2,272,004

SEWAGE PLANT

Benjamin V. Howe and Glen A. Izett,
Denver, Colo.

Application October 26, 1940, Serial No. 363,058

1 Claim. (Cl. 210—2)

This invention appertains to new and useful improvements in sewage disposal plants and more particularly to those plants in which the sewage to be treated is discharged to a settling chamber allowing the solids to settle through an open bottom into a chamber below, usually termed a "sludge chamber" where the solids are allowed to digest for a period of from one to six months, as required. After the solids have digested for a sufficient period of time they are drawn off for disposal. In the present settling plants the solids, when drawn off, are mixed with raw solids recently settled. The raw sewage causes considerable odor to emanate from the withdrawn mass.

The principal object of the present invention is to provide a settling apparatus adapted to keep incoming sewage away from sludge which has been or is being digested.

Another important object of the invention is to provide an apparatus whereby thoroughly digested sludge can be removed from the settling chamber without having it mix with undigested sewage solids.

Other objects and advantages of the invention will become apparent to the reader of the following specification.

Figure 2:
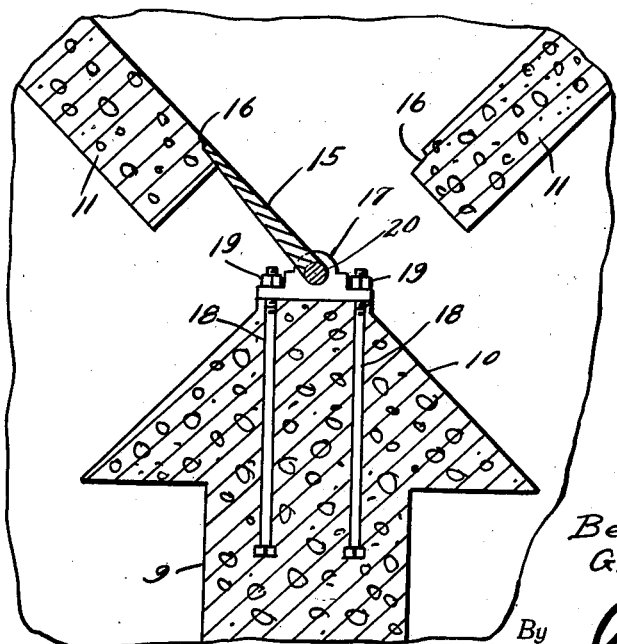

In the drawings:

Figure 1 represents a fragmentary vertical sectional view of a settling chamber, Figure 2 is an enlarged fragmentary detailed sectional view through the gate portion of the settling chamber, Figure 3 is a horizontal sectional view through the settling chamber, Figure 4 is a fragmentary sectional view showing the gate operating means.

Referring to the drawings wherein like numerals designate like parts, it can be seen that numeral 5 denotes an outside wall structure and numeral 6 an inside wall structure. The wall structure 5 has inwardly sloping bottom portions 7 merging with a flat bottom 8 from which rises a partition 9 terminating at its upper edge in a longitudinally extending enlargement or head 10.

The wall structure 6 is provided with inwardly extending and sloping bottom portions 11 which terminate at their lower edges in close spaced relation to leave a slot 12 through which sewage can pass to reach either the sludge chamber 13 or the sludge chamber 14, depending upon the position of a gate 15 mounted on the head 10 of the partition 9. The lower portion of the sloping bottoms 11 of the wall structure 6 are reduced as at 16 so that when the free edge portion of the gate 15 is resting against the same the uppermost surface of the gate will be flush with the uppermost surface of the corresponding sloping wall portion 11.

Bearing elements 17 are located on the partition head 10 and are secured in place by bolts 18 anchored in the head 10 and equipped with nut 19 adapted to be fit against the bearings 17. An elongated shaft 20 extends through the bearings 17 and has the gate 15 projecting laterally therefrom.

One end wall 21 has a tube 22 extending therethrough and terminating in a recess 23 at the inner side of the wall 21, at which point the tube 22 is equipped with a cap 24. A stub shaft 25 having its inner end reduced as at 26 for interlapped relation with a correspondingly shaped end of the shaft 20 is provided with a collar 27 located within the recess 23 and this collar 27 has set screws 28 extending through the same to bite into the stub shaft 25.

An elongated sleeve 29 extends through the tube 22 to abut the cap 24 and the outer end of this sleeve 29 and the adjacent end of the tube 22 are provided with outwardly disposed flanges 30 and 31 respectively, interconnected by bolts 32.

The stub shaft 25 extends outwardly beyond the outer end of the sleeve 29 and has a polygonal-shaped recess for receiving a polygonal-shaped stub member 33 on a crank handle 34, the rotation of which will swing the gate 15 either to one wall 11 or the other so that the sewage can be easily removed from one chamber, such as the chamber 13, after it has digested, without in any way mixing with the sewage such as raw solids located in the chamber 14. Further, sewage solids can be allowed to settle into the chamber 13 without in any way mixing with the half or wholly digested sewage solids in the chamber 14.

While the foregoing specifications sets forth the invention in specific terms, it is to be understood that numerous changes in the shape, size and materials may be resorted to without departing from the spirit and scope of the invention as claimed hereinafter.

Having described the invention, what is claimed as new is:

A sewer disposal structure comprising a receiving chamber, a settling chamber, said receiving chamber having an elongated narrow opening in the bottom thereof, a riser on the bottom of the settling chamber dividing the settling chamber into a pair of separated sewage receiving compartments, upstanding threaded members anchored in the riser, a bearing plate having openings therein disposed on the riser and having the threaded members extending through said openings, nuts on the upper ends of the threaded members for holding the plate against the riser, bearings on the plate, a shaft journaled through the bearings and provided with a laterally disposed gate projecting upwardly to terminate within the narrow opening and adapted to engage the lower portions of the receiving chamber at the narrow opening at either one side or the other depending upon the position to which the shaft is moved.

BENJAMIN V. HOWE.
GLEN A. IZETT.